United States Patent Office 2,734,091
Patented Feb. 7, 1956

2,734,091

β-IONONE CONDENSATION REACTIONS

Thomas E. Londergan, Niagara Falls, N. Y., assignor to E. I. du Pont de Nemours and Company, Wilmington, Del., a corporation of Delaware No Drawing. Application August 9, 1954, Serial No. 448,783

6 Claims. (Cl. 260—665)

This invention relates to the condensation reactions of β-ionone and more particularly to the condensation of β-ionone with olefinic compounds and is a continuation-in-part of my copending application, filed February 15, 1952, Serial No. 271,862, now abandoned. In an article ("Chemistry and Industry," vol. 58, page 802 (1939)) the authors Kipping and Wild describe a proposed synthesis for vitamin A in which β-ionone is condensed with a bromoheptadiene to form a tertiary alcohol, the dehydration of which produces the methyl ether vitamin A. According to these authors, β-ionone is reacted with 1-methoxy-3-methyl-6-bromohexadiene-2,4 in the presence of metallic lithium. Such condensation reaction is represented by the following equation:

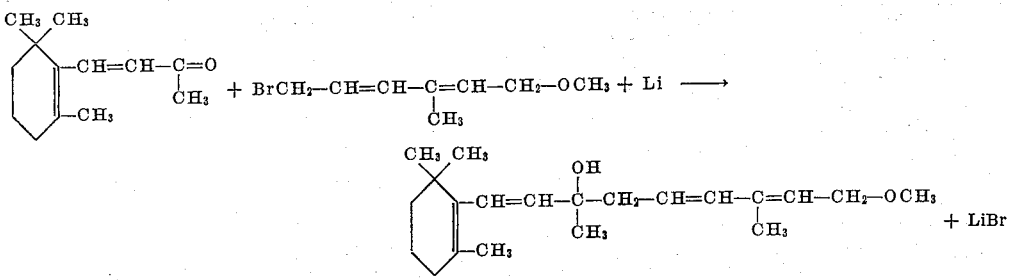

The Kipping and Wild method has been found unsatisfactory for the production of the desired tertiary alcohol, as it has been found that the presence of metallic lithium causes dimerization of the β-ionone.

The Reformatsky reaction has been utilized to form tertiary alcohols from β-ionone, by reacting β-ionone with organic halogen compounds in the presence of zinc in a hydrocarbon solvent, usually benzene. However, the Reformatsky reaction is restricted to reacting a ketone such as β-ionone with an α-halogen carboxylic acid or ester or with γ-halocrotonic acid or ester and is not suitable for condensing β-ionone with compounds which do not contain the carboxyl or ester groups.

An object of the present invention is a novel method for condensing β-ionone with 1-methoxy-3-methyl-6-halohexadiene-2,4 and other compounds containing the halo allyl group represented by the formula

XCH$_2$—CH=CH— where X represents a halogen atom, including the allyl halides and their derivatives. A further object is the production of tertiary alcohols from β-ionone, while avoiding or inhibiting dimerization of the latter. Other objects will be apparent from the following description of the invention.

In accordance with the present invention, I first prepare a lithium compound which may be represented by the formula LiCH$_2$—CH=CHR, where R represents hydrogen or an organic radical containing 1 to 10 carbon atoms, said radical containing 0 to 2 ethylenic groups and 0 to 1 oxygen atom which preferably is present as hydroxyl or ether. The lithium compound then is reacted with β-ionone substantially in the absence of free alkali metal, preferably in solution in a mutual solvent which is substantially unreactive to both reactants. The reaction proceeds readily at room temperature. The invention is illustrated by the following examples:

Example 1

A solution of 19 grams of allyl chloride in 170 ml. of anhydrous ether was reacted with magnesium to convert the allyl chloride to the Grignard compound, allyl magnesium chloride. This reaction was carried out in the so-called "cyclic" Grignard reactor described by D. C. Rowlands (M. S. thesis, Ohio State University, 1948, pages 14–20). A jacketed, vertical tube about 25 inches high by 1 inch inside diameter, filled with magnesium turnings, was connected at the top with a reflux condenser. At one side, a boiling vessel filled with anhydrous diethyl ether was provided with a conduit for leading ether vapors from the vessel into the top of the vertical tube, just below the condenser. A conduit from the bottom of the vertical tube was arranged to lead condensed ether back into the above-mentioned vessel. This conduit was arranged in inverted U-shape so that the condensed ether in the vertical tube covered the magnesium.

The first operation comprised amalgamation of the magnesium. This was done by charging the vertical tube with a mixture of 30 grams of magnesium turnings and 16 grams of mercuric iodide, and sufficient ether to cover the mixture. On standing about 20 minutes, the magnesium acquired an amalgamated surface. Excess mercuric iodide then was removed by washing with pure anhydrous ether.

The boiling vessel then was charged with pure anhydrous ether, which was boiled, to cause a circulation of ether downward through the column of amalgamated magnesium in the vertical tube. Allyl chloride then was charged through the condenser into the vertical tube at a rate sufficiently slow to avoid boiling in the tube. The resulting Grignard compound collected in the boiling vessel as a white gelatinous precipitate. The precipitate in the form of a slurry in the ether was transferred through a tube under the action of nitrogen pressure into a flask containing 7 grams of finely divided lithium metal (in anhydrous ether) and the resulting mixture was stirred for several hours. A grey precipitate comprising metallic magnesium and lithium chloride together with any unreacted lithium was separated by filtration. Titration of an aliquot of the reaction mixture according to the method of Moncrieff (Chemical Age 63, 159 (1950)) showed that the allyl lithium was formed in 48% yield. To the yellow filtrate (ether solution of allyl lithium) was added over the space of 2 hours a solution of 25 grams of β-ionone in 350 ml. of anhydrous ether. The resulting lithium compound of the condensation product then was decomposed by adding 10 grams of a 10% aqueous acetic acid solution with stirring. The ether layer then was separated from the aqueous portion and dried. After evaporation of the ether, the residue (27 grams) was molecularly distilled. The main fraction boiled at 50° C. at a pressure of 8 microns of mercury. The product was a light yellow, viscous oil.

Analysis for carbon and hydrogen gave the following results which are compared with the calculated proportions:

Calculated for C$_{16}$H$_{26}$O: %C, 81.98; %H, 11.08%.
Found: %C, 82.07; %H, 10.87.

Infra-red analysis showed a hydroxyl group in the molecule and this, together with the above analysis and other infra-red studies proved that the product was the desired 4 - methyl-4-hydroxy-6-(2′,2′,6′-trimethylcyclohexene-1′-yl) - 1,5 - hexadiene. These determinations taken together constitute an acceptable proof of the structure of the compound and will meet the demands of the investigators engaged in this field of chemistry. The compound has the following formula:

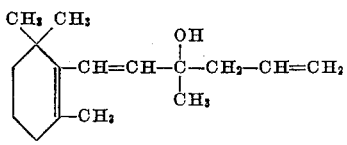

Example 2

Using the "cyclic" Gringard reactor and process described in Example 1, an ether solution of 1-methoxy-3-methyl-6-chloro-2,4-hexadiene is converted into the corresponding Grinard compound: 6-(1-methoxy-3-methyl-2,4-hexadienyl)-magnesium chloride. The prepipitate in the form of a slurry in the ether is transferred under the action of nitrogen pressure into a flask containing finely divided lithium metal in anhydrous ether and the resulting mixture stirred for several hours. The precipitated magnesium metal and lithium chloride together with any unreacted lithium is separated by filtration. To the filtrate is added with stirring an ether solution of β-ionone. The resulting lithium salt of the condensation product is decomposed with a dilute aqueous acidic solution, such as 10% acetic acid. The ether layer is then separated, dried over anhydrous sodium sulfate, and the ether removed by evaporation. The crude residue may be molecularly distilled to give 1-methoxy-3,7-dimethyl-7-hydroxy-9 - (2′,2′,6-trimethylcyclohexene - 1′-yl-2,4,8-nonatriene. The formula of this compound is as follows:

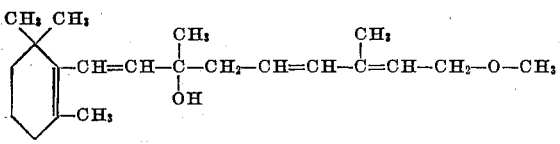

The above compound is useful as an intermediate in the synthesis of vitamin A$_1$.

The present invention is useful for forming the condensation products between an α,β-ethylenic ketone and a compound containing the group —CH$_2$—CH=CH—, to form tertiary alcohols. In its broader aspects the invention consists in reacting an α,β-ethylenic ketone with a compound having the formula: Li—CH$_2$CH=CH—R wherein R represents hydrogen or an organic radical of not more than 10 carbon atoms being essentially a hydrocarbon radical containing not more than two ethylenic or double bond groups and not more than one oxygen atom present in the radical as an ether type linked to two carbon atoms or as a hydroxyl group, preferably a primary hydroxyl. Such lithium compound may be prepared by any suitable method but preferably it is formed by reacting the corresponding halogen compound with magnesium to form the Grignard compound and reacting the latter with lithium metal according to the following equation (wherein X designates a halogen):

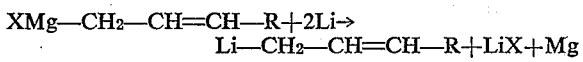

Any method conventionally employed for the Grignard reaction may be utilized to make the herein described Grignard compounds. It is preferred however, to utilize the Rowland cyclic method described in Example 1, in order to obtain the Grignard compound in good yield. The reaction conditions and solvents commonly employed in the Grignard reaction are likewise suitable in the practice of my invention. Precautions must be taken to exclude air and moisture from the reaction. While anhydrous diethyl ether is generally preferred as reaction solvent, other anhydrous ethers may be employed if desired, for example n-dibutyl ether or tetrahydrofuran.

The reaction between the lithium metal compound (e. g., allyl lithium) and the α,β-unsaturated ketone (e. g., β-ionone)) preferably is carried out in solution, using the solvent employed in making the Grignard compound. It is important that the reaction mixture be substantially free from unreacted lithium metal. The reactants should be brought together slowly to avoid excessive temperature rise, which generally results in undesirable side reactions. This may be accomplished by slowly adding the lithium metal compound solution to the ketone or its solution, by slowly adding the ketone or its solution to the lithium metal compound solution, or by simultaneously adding small amounts of both reactants to a reaction vesssel. Cooling may be applied to maintain the reaction temperature at from —20 to about 25° C. Preferably, the reaction temperature is maintained at 10 to 25° C. In this reaction also, air and moisture should be excluded insofar as possible.

The reaction between the ketone and the lithium metal compound forms the lithium derivative (alcoholate) of the tertiary alcohol condensation product, which may be represented by the formula:

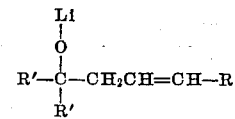

where R represents hydrogen or organic radicals and R′ represents organic radicals. This lithium compound is converted to the free alcohol by treatment with an acidic material, preferably in aqueous solution, for example, dilute aqueous solutions of organic or inorganic acids or acidic salts. Any acidic material which (in the concentration utilized) is substantially unreactive except with the lithium atom may be utilized, e. g. the acids: formic, acetic, acrylic, lactic, hydrochloric, sulfuric or sulfurous and acid salts, e. g. ammonium chloride, zinc, sulfate and the like.

This invention affords an economical method for reacting β-ionone with the heptadiene (3-methyl-6-chlorohexadiene) and its derivatives, particularly the 1-hydroxy and 1-alkoxy derivatives to produce vitamin A$_1$ and its derivatives. The invention also is useful for condensing β-ionone with other unsaturated compounds containing the group —CH$_2$—CH=CH—, to produce a variety of tertiary alcohols containing the β-ionyl group.

The invention may be utilized for the production of vitamin A intermediates and their derivatives by reacting β-ionone with 3-methyl-hexadiene lithium metal compounds such as those having the formula:

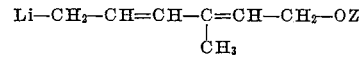

wherein Z represents alkali metal or hydrocarbon radicals of the type, for example, of the following:

1-lithiumoxy-3-methyl-2,4-hexadienyl-6-lithium
1-methoxy-3-methyl-2,4-hexadienyl-6-lithium
1-phenoxy-3-methyl-2,4-hexadienyl-6-lithium
1-benzyloxy-3-methyl-2,4-hexadienyl-6-lithium
1 - tetrahydropyranyloxy - 3 - methyl - 2,4 - hexadienyl-6-lithium The resulting condensation products are tertiary alcohols which are useful in the preparation of vitamin A or its derivatives and which have the general structure:

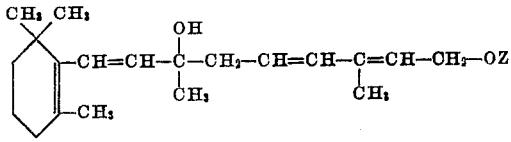

The hydrocarbon radical represented by Z in the above formula may be aliphatic, aromatic or araliphatic, saturated or unsaturated, such as:
1. Alkyl, containing up to 10 carbon atoms.
2. Aromatic, containing 6 to 13 carbon atoms, e. g. phenyl, naphthyl and homologs such as tolyl, xylyl, ethylnaphthyl, propylnaphthyl, and the like.
3. Araliphatic, containing 7 to 14 carbon atoms, e. g. benzyl cinnamyl, hydrocinnamyl, and the like.
4. Tetrahydrofuranyl and tetrahydropyranyl groups.

While the invention has been illustrated by the condensation of allylic lithium compounds with β-ionone, it is not so restricted, but in place of β-ionone I may employ other α,β-ethylenically unsaturated ketones. The invention is particularly useful for condensing allylic compounds with such ketones in which the α,β-double bond is conjugated with another double bond, as in the case of β-ionones. Such unsaturated ketones are those which contain the groupings:

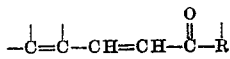

where

represents a hydrocarbon radical containing 1 to 2 carbon atoms. The present invention affords a satisfactory means for converting such ketones to tertiary alcohols which contain the grouping:

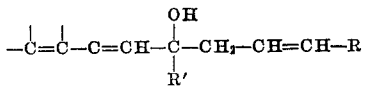

where R represents hydrogen or a radical as defined below.

The present invention also includes as novel products the metal lithium compounds which may be represented by the generic formula:

LiCH₂—CH=CH—R where R represents hydrogen or an organic radical containing not more than 10 carbon atoms nor more than two ethylenic groups and one or no oxygen atoms in a hydroxyl or ether group. Specifically the invention includes the compounds lithium allyl and 1-methoxy-3-methyl-2,4-hexadienyl-6-lithium which have the following formulas:

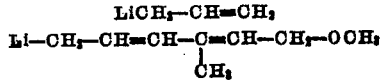

Such lithium compounds are useful for the synthesis of other compounds, by condensation with β-ionone and similar α,β-unsaturated ketones as described above.

I claim:
1. The process comprising reacting β-ionone with a compound having the formula:

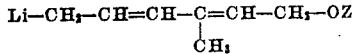

wherein Z represents a radical selected from the group consisting of alkali metal, alkyl containing up to 10 carbon atoms, aromatic containing 6 to 13 carbon atoms, araliphatic containing 7 to 14 carbon atoms, tetrahydrofuranyl and tetrahydropyranyl to form a tertiary alcohol condensation product.
2. The process of claim 1 wherein β-ionone is reacted with 1-methoxy-3-methyl-2,4-hexadienyl-6-lithium.
3. The process which comprises reacting an allylic halide with magnesium to form the Grignard compound, reacting said Grignard compound with lithium to form the corresponding allylic lithium compound, separating said lithium compound from any unreacted lithium metal and reacting the separated lithium compound with a ketone containing the grouping:

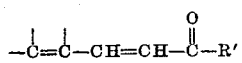

where R' represents a hydrocarbon radical containing 1 to 2 carbon atoms.
4. The process according to claim 3 wherein said ketone is β-ionone.
5. Compounds having the formula:

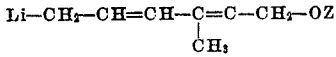

where Z represents a radical selected from the group consisting of alkali metal and hydrocarbon radicals said hydrocarbon radicals consisting of alkyl containing up to 10 carbon atoms, aromatic containing 6 to 13 carbon atoms, araliphatic containing 7 to 14 carbon atoms, tetrahydrofuranyl and tetrahydropyranyl.
6. 1-methoxy-3-methyl-2,4-hexadienyl-6-lithium (Li—CH₂—CH=CH—C=CH—CH₂—OCH₃)
                      |
                     CH₃

References Cited in the file of this patent

Morton et al.: Jour. Amer. Chem. Soc., vol. 72, pgs. 3785–3792 (August 1950).

Braude et al.: Jour. Chem. Soc. London (1951), pgs. 2078–2084.